United States Patent [19]

Ohkanda et al.

[11] Patent Number: 5,079,841
[45] Date of Patent: Jan. 14, 1992

[54] CLIPPER-TYPE BUSH CUTTER

[75] Inventors: Masao Ohkanda, Sagamihara; Yoshiki Nakayama, Akishima, both of Japan

[73] Assignee: Kioritz Corporation, Tokyo, Japan

[21] Appl. No.: 711,000

[22] Filed: Jun. 6, 1991

[30] Foreign Application Priority Data

Jun. 6, 1990 [JP] Japan .................. 2-059232[U]

[51] Int. Cl.5 ............................................. B26B 19/02
[52] U.S. Cl. ...................................... 30/216; 30/228; 56/237; 56/257
[58] Field of Search ................ 30/210, 216, 228, 231, 30/379, 379.5; 56/237, 242, 257, DIG. 17, 158, 123

[56] References Cited

U.S. PATENT DOCUMENTS

| 2,468,312 | 4/1949 | Turner | 56/237 X |
| 3,219,129 | 11/1965 | Yamada et al. | |
| 3,496,709 | 2/1970 | Egbert et al. | 56/237 |
| 3,540,123 | 11/1970 | Yamada et al. | |
| 4,848,846 | 7/1989 | Yamada et al. | 30/236 |
| 4,866,921 | 9/1989 | Nagashima et al. | 56/257 |
| 4,970,791 | 11/1990 | Vergara | 30/216 |

FOREIGN PATENT DOCUMENTS 678862 9/1952 United Kingdom ................ 56/237

Primary Examiner—Douglas D. Watts
Attorney, Agent, or Firm—Browdy and Neimark

[57] ABSTRACT

A clipper-type bush cutter comprises a mount part provided on the side of a power source, an upper part of a head unit connected rotatably within a predetermined angle range back and forth with respect to the mount part, and a lower part of the head unit connected rotatably through 360 degrees in the right and left directions at the bottom of the upper part and for reciprocatably supporting clipper-type cutting blades.

A first relative angle adjusting device is disposed between the upper part and the mount part and a second relative angle adjusting device is disposed between the lower part and the upper part.

3 Claims, 3 Drawing Sheets

CLIPPER-TYPE BUSH CUTTER

BACKGROUND OF THE INVENTION

The present invention relates to a clipper-type bush cutter.

A typical clipper-type bush cutter is provided with two clipper-type cutting blades, which reciprocate relative to each other, in a head unit on the tip of an operating rod. Although this kind of conventional clipper-type bush cutter adjusts the angle of the head unit with the clipper-type cutting blades by the rear portion of the operating rod near at hand, the adjustment range of the angle of the cutting blades is limited by the structure of the cutter. This results in inconvenience in using a single bush cutter in a wide range of applications, such as a bunker edger, a ridge cutter, a hedge trimmer and the like, and such cutting blades are permitted to be applied only to a bush cutter having a rigid and straight operating rod.

SUMMARY OF THE INVENTION

An object of the present invention is to provide a clipper-type bush cutter which eliminates the above-mentioned disadvantages of the prior art and which has a simple and convenient shape.

In other words, the clipper-type bush cutter of the present invention comprises a mount part provided on the side of a power source, an upper part of a head unit connected rotatably within a predetermined angle range back and forth with respect to the mount part, and a lower part of the head unit connected rotatably through 360 degrees in the right and left directions at the bottom of the upper part and for reciprocatably supporting clipper-type cutting blades. A first relative angle adjusting device is disposed between the upper part and the mount part, and a second relative angle adjusting device is disposed between the lower part and the upper part.

Therefore, it is possible to turn the upper part of the head unit to a desired position within a predetermined angle range back and forth with respect to the mount part and to fix the upper part in the position by operating the first relative angle adjusting device. Furthermore, it is possible to turn the lower part of the head unit to a desired position through 360 degrees in the right and left directions with respect to the upper part and the mount part and to fix the lower part in the position by operating the second relative angle adjusting device. Thereby, the clipper-type cutting blades can be set in a desired position in the back, forth, right and left directions as necessity requires, a single clipper-type bush cutter can be used as various kinds of machines, such as a bunker edger, a ridge cutter and a hedge trimmer, and in an operation state suitable for an operator, and the present invention is also applicable to a machine in which a flexible middle portion is provided in an operating rod.

PREFERRED EMBODIMENT OF THE INVENTION

Figure 1:
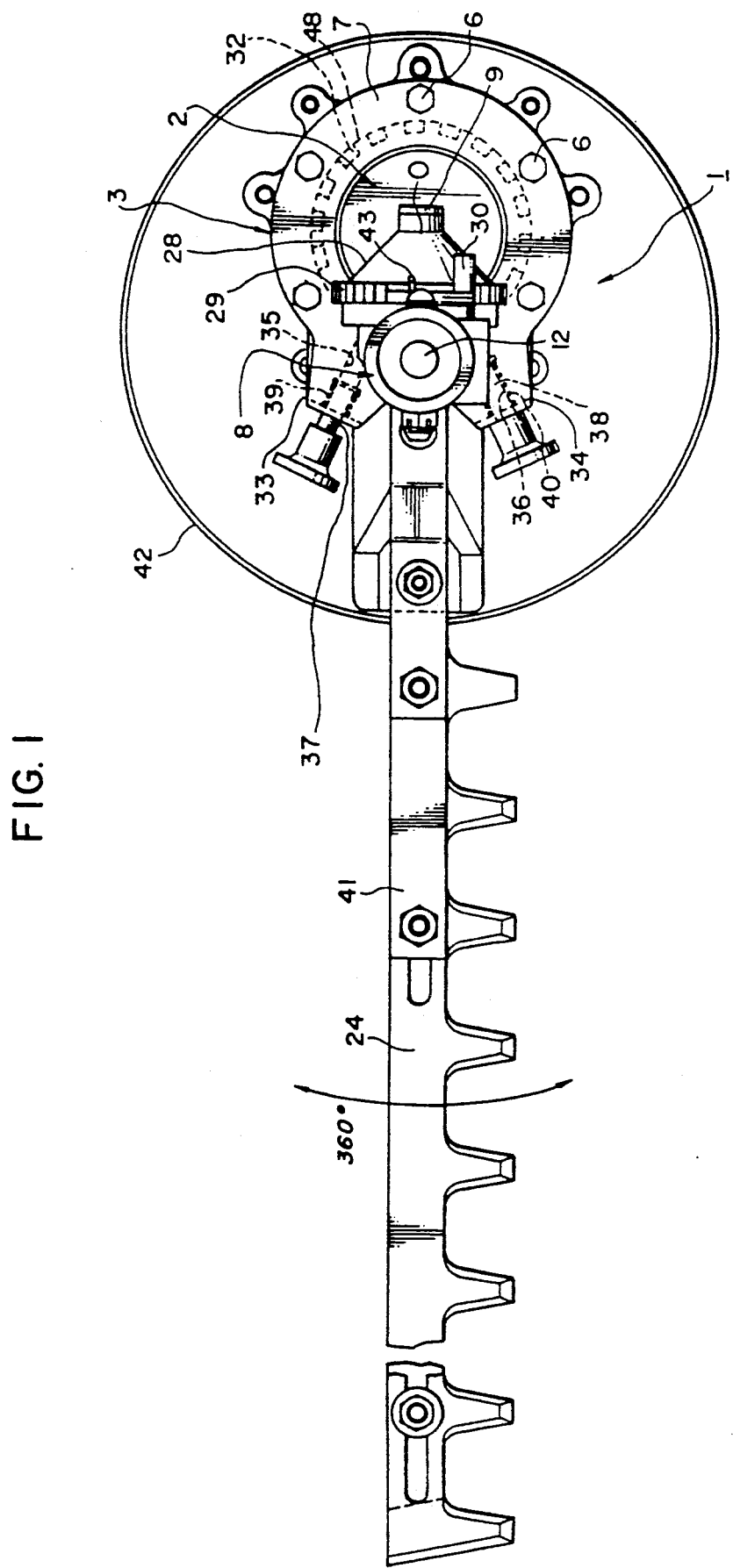
FIG. 1 is a plan view of an embodiment of a head unit of a clipper-type bush cutter according to the present invention.
Figure 2:
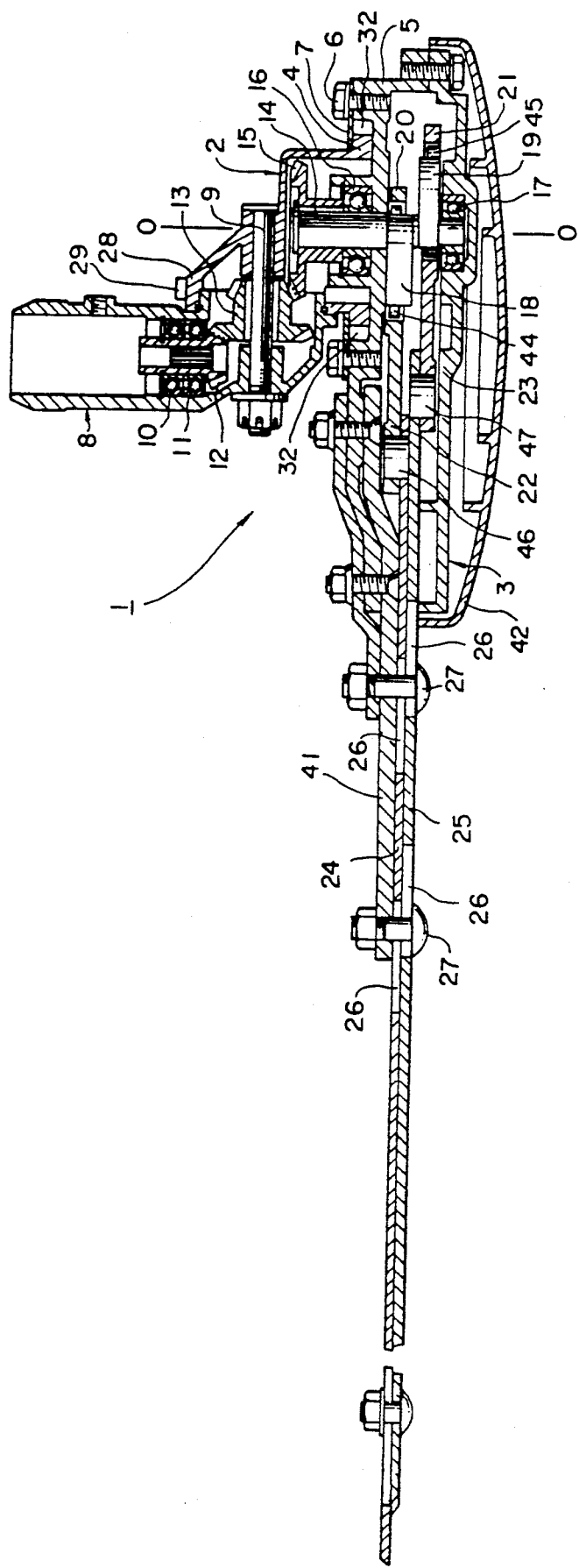
FIG. 2 is a longitudinal sectional view of the head unit shown in FIG. 1.
Figure 3:
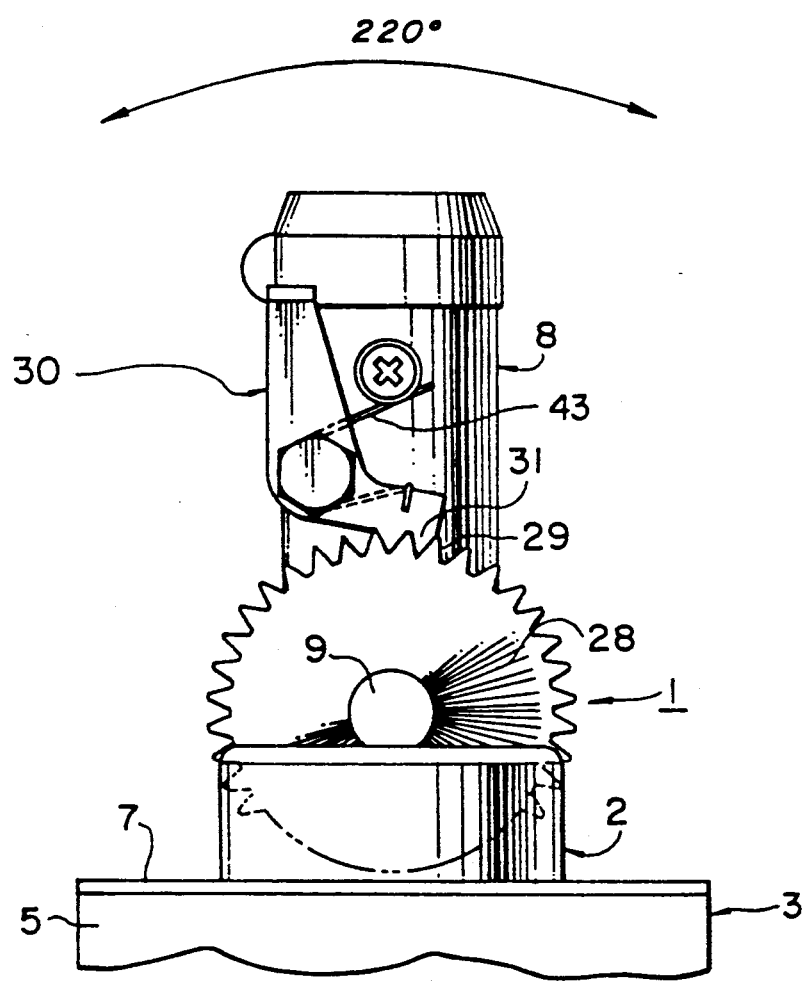
FIG. 3 is a principal elevational view of the head unit shown in FIG. 1 from the right side thereof.

The present invention will be described according to an embodiment shown in the drawings.

In an illustrated bush cutter of the embodiment, a head unit 1 comprises an upper part 2 and a lower part 3. In the upper part 2, a circular peripheral portion 4 which protrudes outward in the radial direction is disposed slidably in the circumferential direction in a circular protruding portion 5 which protrudes above the lower part 3, and is held by a circular holding plate 7 fixed with a plurality of bolts 6 screwed on the circular protruding portion 5 of the lower part 3 not to be separated upward from the lower part 3. The upper part 2 and the lower part 3 can rotate relative to each other around the vertical axis O—O common to the circular peripheral portion 4 and the circular protruding portion 5. Furthermore, a mount part 8 attached to an operating rod (not shown) of the bush cutter is disposed above the upper part 2 of the head unit 1, and is supported rotatably in a vertical plane back and forth with respect to the upper part 2 of the head unit around a horizontal shaft 9 which extends horizontally. A drive bevel gear 12 with an input shaft rotatably supported by bearings 10 and 11 is mounted inside of the mount part 8, and engages an intermediate-opposed bevel gear 13 relatively rotatably supported on the horizontal shaft 9 with respect to the horizontal shaft 9. The intermediate-opposed bevel gear 13 engages a driven bevel gear 15 fixed to a cam shaft 14 vertically disposed corresponding to the axis O—O in the head unit 1. The cam shaft 14 is rotatably supported by bearings 16 and 17 disposed in the lower part 3 of the head unit 1, and has a pair of eccentric circular cam portions 18 and 19 with a phase shift of 180° therebetween at the bottom thereof. Circular cam followers 20 and 21 are relatively rotatably disposed on respective peripheral surfaces of the circular cam portions 18 and 19 through rollers 44 and 45 and integrally form connecting ends 22 and 23, which extend outward in the radial direction, respectively. Base end portions of a pair of upper and lower clipper-type cutting blades 24 and 25 are connected to the connecting ends 22 and 23 through pins 46 and 47 of the connecting ends 22 and 23. The clipper-type cutting blades 24 and 25 each have a plurality of longitudinal slots 26. A support plate 41 fixed to the lower part 3 of the head unit 1 and a guide pin 27 penetrate the slots 26 and guide the cutting blades 24 and 25 to longitudinally and relatively reciprocate. When the drive bevel gear 12 is rotated by power from an internal combustion engine (not shown) at the rear of the operating rod in an operation, and the cam shaft 14 is thereby rotated through the intermediate-opposed bevel gear 13 and the driven gear 15, the cam portions 18 and 19 drive the cam followers 20 and 21 with a phase shift of 180° therebetween. Thus, the pair of upper and lower clipper-type cutting blades 24 and 25 reciprocate with each other longitudinally and can cut grass or the like.

On the other hand, the upper part 2 of the head unit 1 has a conical portion 28 disposed concentrically with the horizontal shaft 9, which has many teeth 29 arranged in the circumferential direction on the periphery thereof. The mount part 8 pivotally supports a lever member 30 biasedly pressed by a torsion spring 43. A retaining end 31 of the lever member 30 engages the teeth 29 of the conical portion 28 of the upper part 2 by the spring force, thereby retaining the upper part 2 of the head unit 1 and the mount part 8 around the horizontal shaft 9 while prohibiting the relative movement thereof. When the lever member 30 is pivoted at the other end thereof against the action of the spring 43, the retaining end 31 is separated from the teeth 29. Thus, the upper part 2 can relatively rotate together with the lower part 3 in a vertical plane through approximately 220 degrees around the horizontal shaft 9 back and forth in respect to the mount part 8, that is, to the operating rod. In other words, the teeth 29, the retaining end 31 of the lever member 30, and the spring 43 constitute the first relative angle adjusting device which adjusts the relative angle position of the mount part 8 and the upper part 2 of the head unit 1.

Furthermore, a plurality of concave portions 32 are arranged at regular intervals in the circumferential direction on the peripheral surface of the circular peripheral portion 4 in the upper part 2 of the head unit 1. On the other hand, the lower part 3 of the head unit 1 integrally forms a pair of protruding portions 33 and 34 which project outward in the radial direction. Radial direction holes 35 and 36 are formed in the protruding portions 33 and 34 respectively, and retaining pins 37 and 38 are inserted in the radial direction holes 35 and 36, respectively, and movable in the radial direction. The retaining pins 37 and 38 are biasedly pressed inward in the radial direction by compression coil springs 39 and 40, respectively. Respective inner ends (not shown) of the retaining pins 37 and 38 alternately engage one of the concave portions 32 of the circular peripheral portion 4 in the upper part 2 of the head unit 1 and one of protruded portions 48 between the concave portions 32 so as to support the upper part 2 and the lower part 3 of the head unit 1 while prohibiting the relative movement thereof. By simultaneously gripping and pulling the outer ends of the pair of retaining pins 37 and 38 outwardly in the radial direction, the inner end of the retaining pin 38 which engages the concave portion 32 is detached from the concave portion 32, and the inner end of the other retaining pin 73 which lies on the protruded portion 48 is prevented from engaging the concave portion 32. In this state, the lower part 3 can be widely turned to an desired position through 360 degrees relatively in the horizontal right and left directions around the cam shaft 14 with respect to the upper part 2, that is, the mount part 8 and the operating rod together with the clipper-type cutting blades 24 and 25.

If the lower part 3 is rotated by pulling only the retaining pin 38 which engages the concave portion 32, since the other retaining pin 38 immediately engages the concave portion 32 next to the protruded portion 48 which the retaining pin 38 has engaged so far, fine adjustment by one pitch between the concave portion 32 and the protruded portion 48 is possible.

The concave portion 32, the protruding portions 33 and 34, the radial direction holes 35 and 36, the retaining pins 37 and 38 and the compression coil springs 39 and 40 constitute the second relative angle adjusting device.

The angle of the clipper-type cutting blades 24 and 25 is thus adjusted approximately 220 degrees back and forth and 360 degrees in the right and left directions with respect to the operating rod. Therefore, it is possible to use a single bush cutter as a bunker edger, a ridge cutter, a hedge trimmer and the like, and to set the clipper-type cutting blades 24 and 25 in a position suitable for the operator. Furthermore, since all the above-mentioned angle adjusting mechanisms are mounted in the head unit 1, the present invention is also applicable to a bush cutter having a flexible intermediate portion mounted on the operating rod.

Numeral 42 shown in the drawings denote a dish-like skid attached to the lower part 3 of the head unit 1 so as to enhance operability.

What is claimed is:

1. A clipper-type bush cutter, comprising:
    a mount part provided on the side of a power source;
    an upper part of a head unit connected rotatably within a predetermined angle range back and forth with respect to said mount part; and
    a lower part of the head unit connected rotatably through 360 degrees in the right and left directions at the bottom of said upper part and for reciprocatably supporting clipper-type cutting blades,
    wherein a first relative angle adjusting device is disposed between said upper part and said mount part, and a second relative angle adjusting device is disposed between said lower part and said upper part.

2. A clipper-type bush cutter according to claim 1, wherein, in said first relative angle adjusting device, a lever member is biasedly pressed by a spring and pivotally supported by said mount part, and a retaining end of said lever member engages teeth of a conical portion of said upper part by the spring force.

3. A clipper-type bush cutter according to claim 1, wherein, in said second relative angle adjusting device, a plurality of concave portions are arranged at regular intervals in the circumferential direction on the peripheral surface of a circular peripheral portion in said upper part, a pair of protruding portions which protrude outward in the radial direction holes are formed in said protruding portions, and retaining pins movable in the radial direction are inserted in said radial direction holes, respectively.

* * * * *